(12) United States Patent
Amir et al.

(10) Patent No.: US 12,400,532 B2
(45) Date of Patent: Aug. 26, 2025

(54) DETECTING AN OBJECT IN AN ENVIRONMENT

(71) Applicant: Essence Security International (E.S.I.) Ltd., Herzlia Pituach (IL)

(72) Inventors: Ohad Amir, Herzlia (IL); Gregory Morav, RaAnana (IL); Ran Rosenblum, Petach Tikva (IL); Jonathan Mark Schnapp, Tel Aviv (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 0 days.

(21) Appl. No.: 18/013,494

(22) PCT Filed: Jul. 12, 2021

(86) PCT No.: PCT/IL2021/050853
§ 371 (c)(1),
(2) Date: Dec. 28, 2022

(87) PCT Pub. No.: WO2022/013864
PCT Pub. Date: Jan. 20, 2022

(65) Prior Publication Data
US 2023/0245541 A1    Aug. 3, 2023

(30) Foreign Application Priority Data
Jul. 12, 2020   (IL) ......................................... 276002

(51) Int. Cl.
*G08B 15/00*   (2006.01)
*G01S 13/04*   (2006.01)
(Continued)

(52) U.S. Cl.
CPC .............. *G08B 15/00* (2013.01); *G01S 13/04* (2013.01); *G01S 13/886* (2013.01); *G08B 3/10* (2013.01); *G08B 13/181* (2013.01)

(58) Field of Classification Search
None
See application file for complete search history.

(56) References Cited

U.S. PATENT DOCUMENTS 6,967,612 B1   11/2005   Gorman et al.
7,439,902 B2   10/2008   Robertson et al.
(Continued)

FOREIGN PATENT DOCUMENTS

CN   110728817 A      1/2020
DE   102013215207 A1  2/2015
(Continued)

OTHER PUBLICATIONS

Foreign Communication from a Related Counterpart Application, International Search Report and Written Opinion dated Nov. 8, 2022, International Application No. PCT/IL2022/050402 filed on Apr. 18, 2022.
(Continued)

*Primary Examiner* — Thomas S McCormack
(74) *Attorney, Agent, or Firm* — Conley Rose, P.C.

(57) ABSTRACT

An apparatus, method, and system for detecting an object in an environment. The apparatus comprises: a processor configured to: control an active reflected wave detector to measure wave reflections from the environment to accrue measured wave reflection data; process the measured wave reflection data to detect an object in said environment; in response to detection of said object, determine whether a first predetermined condition in respect of the object is met; and if the first predetermined condition is met, control an output device to output a deterrent.

20 Claims, 5 Drawing Sheets

(51) Int. Cl.
  *G01S 13/88* (2006.01)
  *G08B 3/10* (2006.01)
  *G08B 13/181* (2006.01)

(56) References Cited

U.S. PATENT DOCUMENTS

| | | |
|---|---|---|
| 7,463,182 B1 | 12/2008 | Morinaga et al. |
| 8,970,374 B2 | 3/2015 | Guetta et al. |
| 10,380,880 B1 | 8/2019 | Darling et al. |
| 10,402,938 B1 | 9/2019 | Newman et al. |
| 10,656,264 B2 | 5/2020 | Lee |
| 10,657,784 B1 | 5/2020 | Gordon et al. |
| 11,348,140 B2 | 5/2022 | Busch |
| 11,385,345 B2 | 7/2022 | Lee |
| 11,465,552 B2 | 10/2022 | Beev et al. |
| 11,501,618 B1 | 11/2022 | Siminoff |
| 2003/0164790 A1 | 9/2003 | Kurita et al. |
| 2012/0092502 A1 | 4/2012 | Knasel et al. |
| 2012/0188081 A1* | 7/2012 | Van Katwijk ........... G01S 13/56 340/541 |
| 2012/0327242 A1 | 12/2012 | Barley et al. |
| 2013/0002434 A1 | 1/2013 | Cuddihy et al. |
| 2013/0038490 A1 | 2/2013 | Garcia |
| 2013/0320863 A1 | 12/2013 | Mitchell et al. |
| 2014/0300735 A1 | 10/2014 | Reibel et al. |
| 2016/0070948 A1 | 3/2016 | Thun-Hohenstein et al. |
| 2016/0295198 A1 | 10/2016 | Grossman et al. |
| 2016/0313442 A1 | 10/2016 | Ho et al. |
| 2016/0345113 A1 | 11/2016 | Lee et al. |
| 2017/0353699 A1 | 12/2017 | Wang |
| 2018/0192919 A1 | 7/2018 | Nakayama et al. |
| 2018/0242160 A1 | 8/2018 | Morita et al. |
| 2018/0246526 A1* | 8/2018 | Wilkinson ........... G05D 1/0278 |
| 2018/0292520 A1 | 10/2018 | Bermudez et al. |
| 2018/0342160 A1 | 11/2018 | Komori et al. |
| 2018/0364350 A1 | 12/2018 | Lee |
| 2019/0098725 A1 | 3/2019 | Sadwick et al. |
| 2019/0120957 A1 | 4/2019 | Herring |
| 2019/0182415 A1 | 6/2019 | Sivan |
| 2019/0188492 A1 | 6/2019 | Kaestle et al. |
| 2019/0199926 A1 | 6/2019 | An et al. |
| 2019/0259270 A1 | 8/2019 | Amini et al. |
| 2019/0268537 A1 | 8/2019 | Jang |
| 2020/0178846 A1 | 6/2020 | Matsumoto |
| 2020/0278443 A1 | 9/2020 | Lee |
| 2021/0103717 A1 | 4/2021 | Portal |
| 2021/0158054 A1 | 5/2021 | Trundle |
| 2021/0158819 A1 | 5/2021 | Kim |
| 2021/0287343 A1 | 9/2021 | Kaida |
| 2021/0289168 A1 | 9/2021 | Gluckert et al. |
| 2021/0333403 A1 | 10/2021 | Wei et al. |

FOREIGN PATENT DOCUMENTS

| | | |
|---|---|---|
| EP | 2353293 A1 | 8/2011 |
| EP | 2784535 A1 | 10/2014 |
| EP | 2318804 B1 | 3/2017 |
| EP | 3203454 A2 | 8/2017 |
| EP | 2911125 B1 | 9/2019 |
| GB | 2266799 A | 11/1993 |
| JP | 2022114383 A | 8/2022 |
| KR | 101690781 B1 | 12/2016 |
| KR | 20180129240 A | 12/2018 |
| WO | 2006093527 A2 | 9/2006 |
| WO | 2010052661 A1 | 5/2010 |
| WO | 2020161703 A2 | 8/2020 |
| WO | 2020223318 A1 | 11/2020 |
| WO | 2022013863 A1 | 1/2022 |
| WO | 2022013864 A1 | 1/2022 |
| WO | 2022144876 A1 | 7/2022 |

OTHER PUBLICATIONS

Foreign Communication from a Related Counterpart Application, International Search Report and Written Opinion dated Aug. 13, 2020, International Application No. PCT/IL2020/050130 filed on Feb. 4, 2020.

Foreign Communication from a Related Counterpart Application, International Search Report and Written Opinion dated Oct. 21, 2021, International Application No. PCT/IL2021/050852 filed on Jul. 12, 2020.

Foreign Communication from a Related Counterpart Application, International Search Report and Written Opinion dated May 19, 2022, International Application No. PCT/IL2021/051532 filed on Dec. 23, 2021.

Foreign Communication from a Related Counterpart Application, International Preliminary Report on Patentability, dated Jan. 17, 2023, International Application No. PCT/IL2021/050852 filed on Jul. 12, 2021.

Foreign Communication from a Related Counterpart Application, International Preliminary Report on Patentability dated Jul. 4, 2023, International Application No. PCT/IL2021/051532 filed on Dec. 23, 2021.

Amir, Ohad, et al., "Detecting an Object in an Environment", filed Dec. 29, 2022, U.S. Appl. No. 18/013,891.

Amir, Ohad, et al., "A Device for Monitoring an Environment", filed Jun. 29, 2023, U.S. Appl. No. 18/259,937.

Foreign Communication from a Related Counterpart Application, Office Action dated Jan. 31, 2024, European Application No. 21748967.3 filed on Jul. 12, 2021.

Foreign Communication from a Related Counterpart Application, Office Action dated Jan. 29, 2024, European Application No. 21748966.5 filed on Jul. 12, 2021.

Foreign Communication from a Related Counterpart Application, International Search Report and Written Opinion dated Oct. 21, 2021, International Application No. PCT/IL2021/050853 filed on Jul. 12, 2021.

Foreign Communication from a Related Counterpart Application, International Preliminary Report on Patentability dated Jan. 17, 2023, International Application No. PCT/IL2021/050853 filed on Jul. 12, 2021.

Foreign Communication from a Related Counterpart Application, Office Action dated Oct. 7, 2021, Israeli Application No. 264696 filed on Apr. 18, 2022.

Foreign Communication from a Related Counterpart Application, Office Action dated Oct. 10, 2021, Israeli Application No. 264697 filed on Apr. 18, 2022.

Amir, Ohad, et al., "Detecting an Object in an Environment", filed Oct. 16, 2023, U.S. Appl. No. 18/555,710.

Foreign Communication from a Related Counterpart Application, International Preliminary Report on Patentability dated Nov. 2, 2023, International Application No. PCT/IL2022/050402 filed on Apr. 18, 2022.

Office Action dated Feb. 21, 2025, U.S. Appl. No. 18/555,710, filed Oct. 16, 2023.

* cited by examiner

DETECTING AN OBJECT IN AN ENVIRONMENT

CROSS-REFERENCE TO RELATED APPLICATIONS

The present application is a filing under 35 U.S.C. 371 as the National Stage of International Application No. PCT/IL2021/050853, filed Jul. 12, 2021, entitled "DETECTING AN OBJECT IN AN ENVIRONMENT," which claims priority to Israel Application No. 276002 filed with the Intellectual Property Office of Israel on Jul. 12, 2020, both of which are incorporated herein by reference in their entirety for all purposes.

BACKGROUND

Motion sensors are designed to monitor a defined area, which may be outdoors (e.g., entrance to a building, a yard, and the like), and/or indoors (e.g., within a room, in proximity of a door or window, and the like). Motion sensors may be used for security purposes, to detect intruders based on motion in areas in which no motion is expected, for example, an entrance to a home at night.

Some security systems employ a motion sensor in the form of a passive infrared (PIR) detector to sense the presence of a heat-radiating body (i.e., such a heat-radiating body would typically indicate the presence of an unauthorized person) in its field of view, and then issue a deterrent such as an audible alarm sound.

Some security systems employ a camera in addition to a motion sensor. It is known to trigger the capture of an image by a camera based on a motion sensor detecting motion.

Background art can be found in EP2353293, EP3203454, and US20140300735A1.

Further background art can be found in U.S. Pat. No. 7,439,902, 8,970,374, US2013/0320863, and EP2318804B1

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

SUMMARY

The inventors have identified that using a PIR detector to trigger the issuance of a deterrent can cause a lot of false triggers, for example a deterrent may be output when the PIR detects a pet that is not a security concern. This causes a nuisance for the user of such systems and is undesirable for battery powered systems where available power is limited due to the power that is unnecessarily consumed when issuing such falsely triggered deterrents.

According to one aspect of the present disclosure there is provided an apparatus for detecting an object in an environment, the apparatus comprising: a processor configured to: control an active reflected wave detector to measure wave reflections from the environment to accrue measured wave reflection data; process the measured wave reflection data to detect an object in said environment; in response to detection of said object, determine whether a first predetermined condition in respect of the object is met; and if the first predetermined condition is met, control an output device to output a deterrent.

The processor may be configured to control the active reflected wave detector to measure wave reflections from the environment in response to a motion sensor detecting motion in said environment.

The first predetermined condition in respect of the object may comprise that the object is determined to be human.

The first predetermined condition in respect of the object may comprise that the object is located in a predetermined area within a field of view of the active reflected wave detector.

The output device may comprise a lighting device comprising at least one light source, and in response to determining that the first predetermined condition is met, the processor may be configured to control the at least one light source to emit light as said deterrent.

The lighting device may comprises an array of multiple light sources configured to illuminate a plurality of regions. Preferably, the processor is configured to process the measured wave reflection data to determine a location of said object in the environment and selectively control one or more of the multiple light sources to emit a beam of light to selectively illuminate said location by selecting a subset of the regions. The multiple light sources may be light emitting diodes.

The output device may comprise a speaker, and in response to determining that the first predetermined condition is met, the processor may be configured to control the speaker to emit audio as said deterrent.

The audio of said deterrent may be an alarm sound. The audio of said deterrent may be an audible speech message.

In some embodiments, the processor is configured to: process further measured wave reflection data accrued by the active reflected wave detector to determine whether a second predetermined condition in respect of the object is met; and if the second predetermined condition is met, control the output device to output a second deterrent.

The second predetermined condition may be based at least on a location of said object in the environment.

The second predetermined condition may comprise that the deterrent was output based on the object being located in a predetermined area within a field of view of the active reflected wave detector, and the object remains in said predetermined area after a predetermined time period has elapsed after output of said deterrent.

The second predetermined condition may comprises that the deterrent was output based on the object being located in a first predetermined area within a field of view of the active reflected wave detector, and the object is located in a second predetermined area within the field of view of the active reflected wave detector after a predetermined time period has elapsed after output of said deterrent.

The second predetermined condition may be based at least on a direction of travel of said object in the environment determined after a predetermined time period has elapsed after output of said deterrent.

The second predetermined condition may comprise that the deterrent was output based on the object being located in a first predetermined area within a field of view of the active reflected wave detector, and the object has moved towards a second predetermined area or a designated location within the field of view of the active reflected wave detector.

If the second predetermined condition is met, the processor may be configured to control a camera to capture an image of said environment.

The processor may be configured to: process further measured wave reflection data accrued by the active reflected wave detector to determine whether a third predetermined condition in respect of the object is met, the third predetermined condition indicative of the object leaving a location in said environment, and if the third predetermined condition is met, the processor is configured to perform at least one of: control a speaker to output an audible speech message, the output device comprising said speaker; and control the output device to cease output of the deterrent.

The output device may comprise a lighting device comprising at least one light source and the processor may be configured to control the at least one light source to emit light as the second deterrent.

The output device may comprise a speaker, and the processor may be configured to control the speaker to emit audio as the second deterrent.

The active reflected wave detector may be a radar sensor.

If the first predetermined condition is met, the processor may be configured to control a camera to capture an image of said environment.

The apparatus may comprise a housing holding the processor. The housing may additionally hold one or any combination of: the motion sensor, the active reflected wave detector, and the camera.

According to another aspect of the present disclosure there is provided a computer implemented method for detecting an object in an environment, the method comprising: controlling an active reflected wave detector to measure wave reflections from the environment to accrue measured wave reflection data; processing the measured wave reflection data to detect an object in said environment; in response to detection of said object, determining whether a first predetermined condition in respect of the object is met; and if the first predetermined condition is met, controlling an output device to output a deterrent.

According to another aspect of the present disclosure there is provided a computer-readable storage medium comprising instructions which, when executed by a processor cause the processor to perform the method steps of one or more embodiments described herein.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language, or any other code for executing by any one or more other processing device, e.g. such as those exemplified herein.

According to another aspect of the present disclosure there is provided a system for detecting an object in an environment, the system comprising: a first device comprising an active reflected wave detector to measure wave reflections from the environment to accrue measured wave reflection data; an output device; and at least one processor, wherein the at least one processor is configured to: process the measured wave reflection data to detect an object in said environment; in response to detection of said object, determine whether a first predetermined condition in respect of the object is met; and control the output device to output a deterrent based on at least that the first predetermined condition is met.

The first device may comprise the output device.

The output device may be remote from the first device.

The first device may comprise a processor of said at least one processor to process the measured wave reflection data to detect an object in said environment.

This processor may be configured perform at least one of: said determination as to whether the first predetermined condition in respect of the object is met; or said control of the output device to output the deterrent based on at least that the first predetermined condition is met.

The first device may comprise said at least one processor.

As will be appreciated from the description herein, each processor of the at least one processor may be comprised of a plurality of processing units/devices.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE SEVERAL VIEWS OF THE DRAWINGS

For a better understanding of the present disclosure and to show how embodiments may be put into effect, reference is made to the accompanying drawings in which.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD- ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises", "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, microcontroller or other type of processing device or combination thereof.

Specific embodiments will now be described with reference to the drawings.

Figure 1:
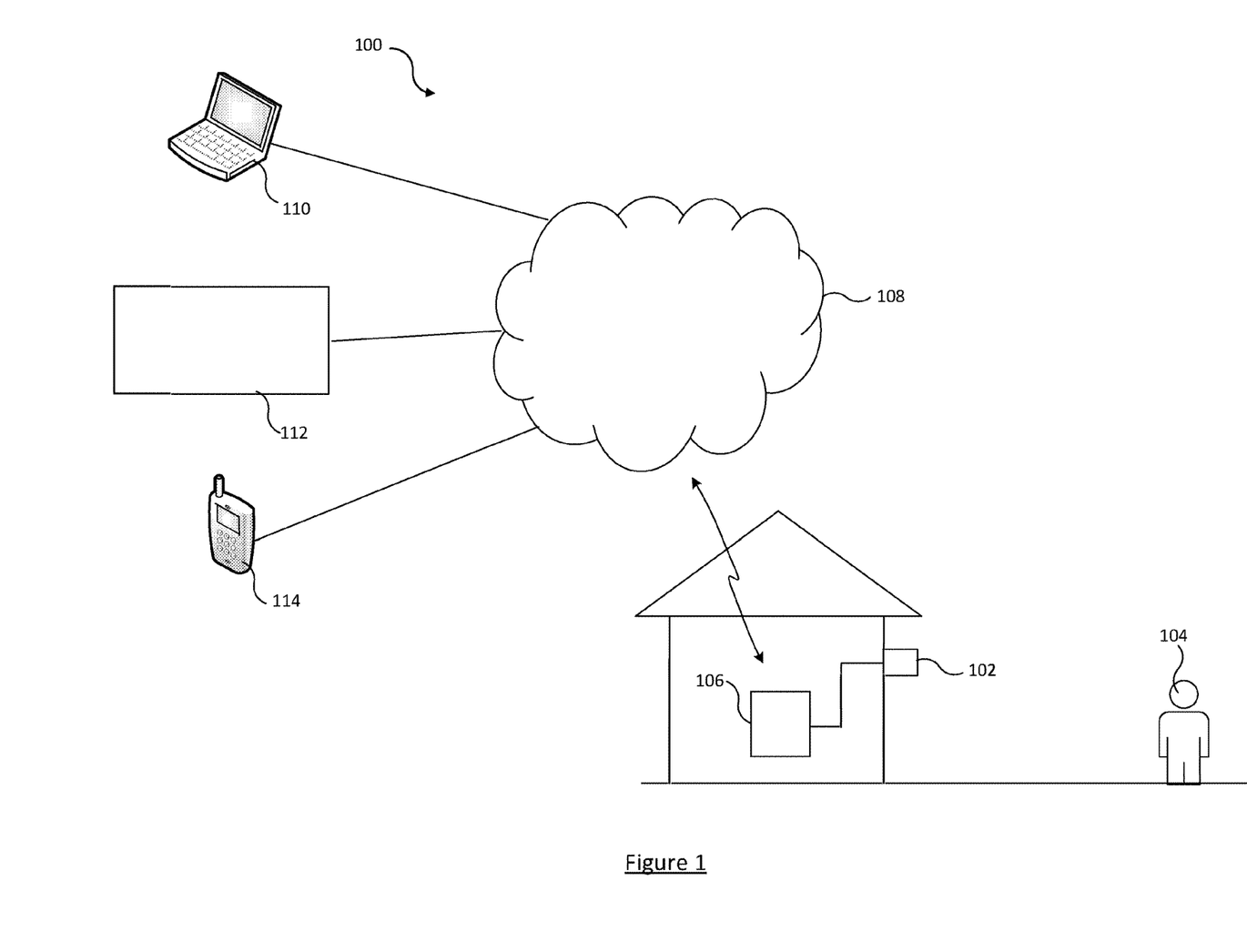
FIG. 1 illustrates system comprising an environment in which a device has been positioned.

FIG. 1 illustrates a system 100 comprising an environment in which a device 102 has been positioned. The environment may for example be an outdoor space such as an area outside of a residential property (e.g. a garden) or commercial property, or a public space (e.g. train station). Alternatively, the environment may be an indoor space such as a room of a home, a public building or other indoor space.

The device 102 is configured to monitor the environment in which a target object (e.g. a person 104) may be present.

As shown in FIG. 1, the device 102 may be coupled to a remote device by way of a wired and/or wireless connection. In particular the device 102 may be coupled, preferably wirelessly, to a hub device 106 (otherwise referred to herein as a control hub), which may be in the form of a control panel.

The control hub 106 may transmit data to a remote monitoring station 110 over a network 108. An operator at the remote monitoring station 110 responds as needed to incoming notifications triggered by the device 102 and may also respond to incoming notifications triggered by other similar devices which monitor other environments. In other embodiments, the device 102 may transmit data to the remote monitoring station 110 without interfacing with the control hub 106. In both examples, the data from the device 102 may be sent (from the device 102 or control hub 106) directly to the remote monitoring station 110 or via a remote server 112. The remote monitoring station 110 may be for example a laptop, notebook, desktop, tablet, smartphone or the like.

Additionally or alternatively, the control hub 106 may transmit data to a remote personal computing device 114 over a network 108. A user of the remote personal computing device 114 is associated with the environment monitored by the device 102, for example the user may be the home owner of the environment being monitored, or an employee of the business whose premises are being monitored by the device 102. In other embodiments, the device 102 may transmit data to the remote personal computing device 114 without interfacing with the control hub 106. In both examples the data from the device 102 may be sent (from the device 102 or control hub 106) directly to the remote personal computing device 114 or via the server 112. The remote personal computing device 114 may be for example a laptop, notebook, desktop, tablet, smartphone or the like.

The network 108 may be any suitable network which has the ability to provide a communication channel between the device 102 and/or the control hub 106 to the remote devices 110,112,114.

Figure 2:
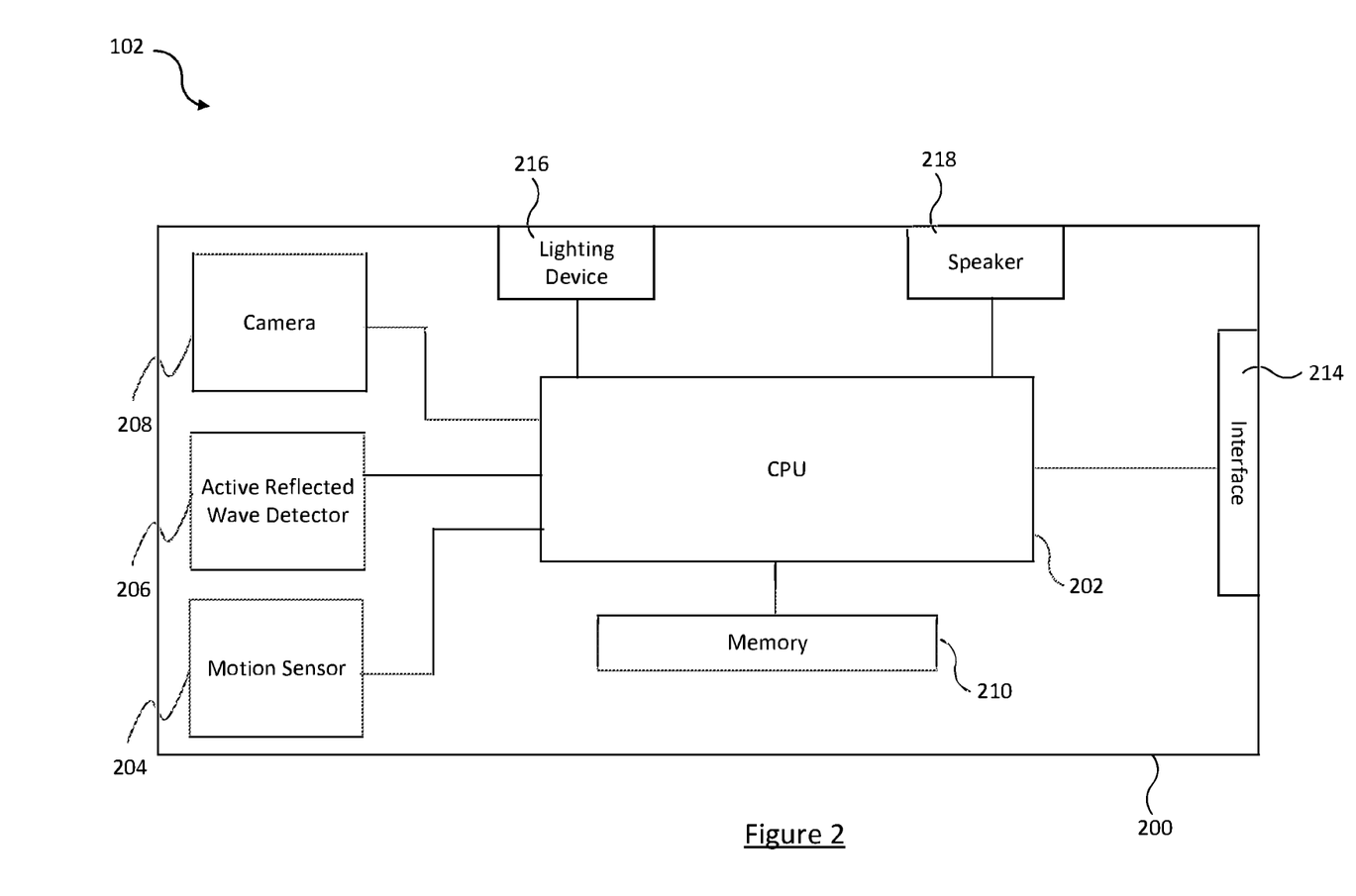
FIG. 2 is a schematic block diagram of the device.

FIG. 2 illustrates a simplified view of the device 102. As shown in FIG. 2, the device 102 comprises a central processing unit ("CPU") 202, to which is connected a memory 210. The functionality of the CPU 202 described herein may be implemented in code (software) stored on a memory (e.g. memory 210) comprising one or more storage media, and arranged for execution on a processor comprising one or more processing units. That is, the device 102 may comprise one or more processing units for performing the processing steps described herein. The storage media may be integrated into and/or separate from the CPU 202. The code is configured so as when fetched from the memory and executed on the processor to perform operations in line with embodiments discussed herein. Alternatively it is not excluded that some or all of the functionality of the CPU 202 is implemented in dedicated hardware circuitry (e.g. ASIC(s), simple circuits, gates, logic, etc.) and/or configurable hardware circuitry like an FPGA. In other embodiments (not shown) the processor that executes the processing steps described herein may be comprised of distributed processing devices, which may for example comprise any one or more of the processing devices or units referred to herein. The distributed processing devices may be distributed across two or more devices shown in the system 100.

FIG. 2 shows the CPU 202 being connected to a motion sensor 204, an active reflected wave detector 206, and a camera 208. While in the illustrated embodiment the motion sensor 204, active reflected wave detector 206, and the camera 208 are separate from the CPU 202, in other embodiments, at least part of processing aspects of the motion sensor 204 and/or active reflected wave detector 206 and/or camera 208 may be provided by a processor that also provides the CPU 202, and resources of the processor may be shared to provide the functions of the CPU 202 and the processing aspects motion sensor 204 and/or active reflected wave detector 206 and/or camera 208. Similarly, functions of the CPU 202, such as those described herein, may be performed in the motion sensor 204 and/or the active reflected wave detector 206 and/or the camera 208.

It will be appreciated from the below that in some embodiments, the motion sensor 204 may not be present. In embodiments where the device 102 comprises the motion sensor 204, the active reflected wave detector 206 may consume more power in an activated state (i.e. when turned on and operational) than the motion sensor 204 does when in an activated state.

It will be appreciated from the below that in some embodiments, the camera 208 may not be present.

As shown in FIG. 2, a housing 200 of the device 102 may house the motion sensor 204, the active reflected wave detector 206 and the camera 208. Alternatively, the motion sensor 204 may be external to the device 102 and be coupled to the CPU 202 by way of a wired or wireless connection. Similarly, the active reflected wave detector 206 may be external to the device 102 and be coupled to the CPU 202 by way of a wired or wireless connection. Similarly, the camera 208 may be external to the device 102 and be coupled to the CPU 202 by way of a wired or wireless connection. Further, the outputs of the motion sensor 204 and/or active reflected wave detector 206 and/or camera 208 may be wirelessly received from/via an intermediary device that relays, manipulates and/or in part produces their outputs, for example the control hub 106.

In some embodiments, the CPU 202 is configured to detect motion in the environment based on an output of the motion sensor 204. The motion sensor 204 may be a passive infrared (PIR) sensor. The motion sensor is preferably a PIR sensor, however it could be an active reflected wave sensor, for example radar, that detects motion based on the Doppler effect. For example, the motion sensor 204 may be a radar based motion sensor which detects motion based on the Doppler component of a radar signal.

The active reflected wave detector 206 may operate in accordance with one of various reflected wave technologies. In operation, the CPU 202 uses the output of the active reflected wave detector 206 to determine the presence of a target object (e.g. human).

Preferably, the active reflected wave detector 206 is a radar sensor. The radar sensor 206 may use millimeter wave (mmWave) sensing technology. The radar is, in some embodiments, a continuous-wave radar, such as frequency modulated continuous wave (FMCW) technology. Such a chip with such technology may be, for example, Texas Instruments Inc. part number IWR6843. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimeter waves in the 30 GHz to 300 GHz range. In some embodiments, the radar has a bandwidth of at least 1 GHz. The active reflected wave detector 206 may comprise antennas for both emitting waves and for receiving reflections of the emitted waves, and in some embodiment different antennas may be used for the emitting compared with the receiving.

As will be appreciated the active reflected wave detector 206 is an "active" detector in the sense of it relying on delivery of waves from an integrated source in order to receive reflections of the waves. Thus the active reflected wave detector 206 need not be limited to being a radar sensor. In other embodiments, the active reflected wave detector 206 is a lidar sensor, or a sonar sensor.

The active reflected wave detector 206 being a radar sensor is advantageous over other reflected wave technologies in that radar signals may transmit through some materials, e.g. wood or plastic, but not others—notably water which is important because humans are mostly water. This means that the radar can potentially "see" a person in the environment even if they are behind an object of a radar-transmissive material. This is generally not the case for sonar.

Each of the motion sensor 204 and the active reflected wave detector 206 has a field of view. The motion sensor 204 and the active reflected wave detector 206 may be arranged such that their fields of view overlap. The fields of view of the motion sensor 204 and the active reflected wave detector 206 may partially or fully overlap. Thus there is at least a partial overlap between the fields of view of the motion sensor 204 and the active reflected wave detector 206.

The overlapping, or partial overlapping, of the fields of view is, in some embodiments, in the 3D sense. However in other embodiments the overlapping, or partial overlapping, of the fields of view may be in a 2D, plan view, sense. For example there may be an overlapping field of view in the X and Y axes, but with a non-overlap in the Z axis.

In some embodiments, the CPU 202 is configured to control the camera 208 to capture an image (represented by image data) of the environment. The camera 208 is preferably a visible light camera in that it senses visible light. Alternatively, the camera 208 senses infrared light. One example of a camera which senses infrared light is a night vision camera which operates in the near infrared (e.g. wavelengths in the range 0.7-1.4 µm) which requires infrared illumination e.g. using infrared LED(s) which is not visible to an intruder. Another example of a camera which senses infrared light is a thermal imaging camera which is passive in that it does not require an illuminator, but rather, senses light in a wavelength range (e.g. a range comprising 7 to 15 µm, or 7 to 11 µm) that includes wavelengths corresponding to blackbody radiation from a living person (around 9.5 µm). The camera 208 may be capable of detecting both visible light and, for night vision, near infrared light.

The device 102 may comprise a communications interface 214 for communication of data to and from the device 102. For example, the device 102 may communicate with a remote device 106, 110, 112, 114 via the communications interface 214. Additionally or alternatively, the device 102 may communicate, via the communications interface 214, with one or more of the motion sensor 204, the active reflected wave detector 206, and the camera 208 in embodiments in which such components are not housed in the housing 200 of the device 102.

The device 102 comprises an output device for outputting deterrents to an intruder in the environment. For example, the device may comprise a visual output device in the form of a lighting device 216. The lighting device 216 comprises one or more light sources for emitting visible light into the environment. In some embodiments the lighting device 216 comprises multiple light sources. In embodiments in which the lighting device 216 comprises multiple light sources, the multiple light sources are configured to illuminate a plurality of regions of the environment. As will be described in more detail below, the CPU 202 may selectively control one or more of the multiple light sources to emit a beam of light to a subset (e.g. one region or a cluster of regions) of the plurality of regions to illuminate an intruder wherever they are located. The one or more light sources are preferably LEDs due to their low power consumption which is advantageous for battery powered devices, it will appreciated that other types of light source may be used. Whilst FIG. 2 illustrates the lighting device 216 being housed within the housing 200 this is merely an example. The lighting device 216 may be coupled to the housing 200 by way of a wired and/or wireless connection. Alternatively or additionally, the lighting device 216 may be coupled to the control hub 106 by way of a wired and/or wireless connection.

Additionally or alternatively, the device 102 may comprise an audible output device in the form of a speaker 218 for emitting audio. The term "audio" is used herein to refer to sound having a frequency that is within the human auditory frequency range, commonly stated as 20 Hz-20 kHz. Whilst FIG. 2 illustrates the speaker 218 being housed within the housing 200 this is merely an example. The speaker 218 may be coupled to the housing 200 by way of a wired and/or wireless connection. Alternatively or additionally, the speaker 218 may be coupled to the control hub 106 by way of a wired and/or wireless connection.

Figure 3:
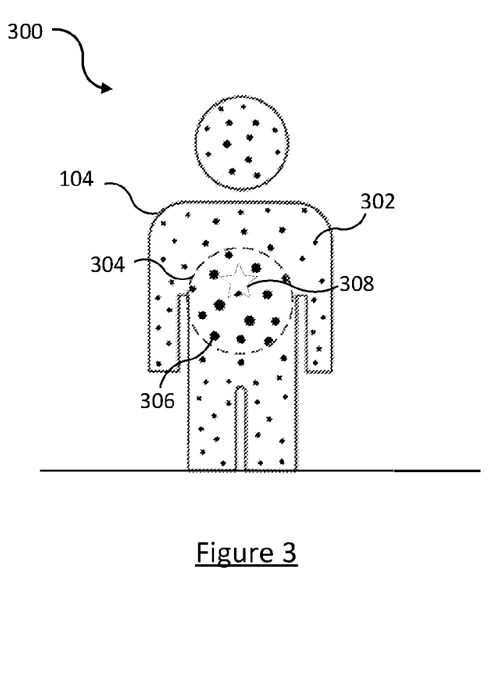
FIG. 3 illustrates a human body with indications of reflections measured by an active reflected wave detector of the device.

FIG. 3 illustrates a free-standing human body 104 with indications of reflective wave reflections therefrom in accordance with some embodiments.

For each reflected wave measurement, for a specific time in a series of time-spaced reflected wave measurements, the reflected wave measurement may include a set of one or more measurement points that make up a "point cloud", the measurement points representing reflections from respective reflection points from the environment. In embodiments, the active reflected wave detector 206 provides an output to the CPU 202 for each captured frame as a point cloud for that frame. Each point 302 in the point cloud may be defined by a 3-dimensional spatial position from which a reflection was received, and defining a peak reflection value, and a doppler value from that spatial position. Thus, a measurement received from a reflective object may be defined by a single point, or a cluster of points from different positions on the object, depending on its size.

In some embodiments, such as in the examples described herein, the point cloud represents only reflections from moving points of reflection, for example based on reflections from a moving target. That is, the measurement points that make up the point cloud represent reflections from respective moving reflection points in the environment. This may be achieved for example by the active reflected wave detector 206 using moving target indication (MTI). Thus, in these embodiments there must be a moving object in order for there to be reflected wave measurements from the active reflected wave detector (i.e. measured wave reflection data), other than noise Alternatively, the CPU 202 receives a point cloud from the active reflected wave detector 206 for each frame, where the point cloud has not had pre-filtering out of reflections from moving points. Preferably for such embodiments, the CPU 202 filters the received point cloud to remove points having Doppler frequencies below a threshold to thereby obtain a point cloud representing reflections only from moving reflection points. In both of these implementations, the CPU 202 accrues measured wave reflection data which corresponds to point clouds for each frame whereby each point cloud represents reflections only from moving reflection points in the environment.

In other embodiments, no moving target indication (or any filtering) is used. In these implementations, the CPU 202 accrues measured wave reflection data which corresponds to point clouds for each frame whereby each point cloud can represent reflections from both static and moving reflection points in the environment.

FIG. 3 illustrates a map of reflections. The size of the point represents the intensity (magnitude) of energy level of the radar reflections (see larger point 306). Different parts or portions of the body reflect the emitted signal (e.g. radar) differently. For example, generally, reflections from areas of the torso 304 are stronger than reflections from the limbs. Each point represents coordinates within a bounding shape for each portion of the body. Each portion can be separately considered and have separate boundaries, e.g. the torso and the head may be designated as different portions. The point cloud can be used as the basis for a calculation of a reference parameter or set of parameters which can be stored instead of or in conjunction with the point cloud data for a reference object (human) for comparison with a parameter or set of parameters derived or calculated from a point cloud for radar detections from an object (human).

When a cluster of measurement points are received from an object in the environment, a location of a particular part/point on the object or a portion of the object, e.g. its centre, may be determined by the CPU 202 from the cluster of measurement point positions having regard to the intensity or magnitude of the reflections (e.g. a centre location comprising an average of the locations of the reflections weighted by their intensity or magnitude). As illustrated in FIG. 3, the reference body has a point cloud from which its centre has been calculated and represented by the location 308, represented by the star shape. In this embodiment, the torso 304 of the body is separately identified from the body and the centre of that portion of the body is indicated. In alternative embodiments, the body can be treated as a whole or a centre can be determined for each of more than one body part e.g. the torso and the head, for separate comparisons with centres of corresponding portions of a scanned body.

In one or more embodiments, the object's centre or portion's centre is in some embodiments a weighted centre of the measurement points. The locations may be weighted according to an Radar Cross Section (RCS) estimate of each measurement point, where for each measurement point the RCS estimate may be calculated as a constant (which may be determined empirically for the reflected wave detector 206) multiplied by the signal to noise ratio for the measurement divided by $R^4$, where R is the distance from the reflected wave detector 206 antenna configuration to the position corresponding to the measurement point. In other embodiments, the RCS may be calculated as a constant multiplied by the signal for the measurement divided by $R^4$. This may be the case, for example, if the noise is constant or may be treated as though it were constant. Regardless, the received radar reflections in the exemplary embodiments described herein may be considered as an intensity value, such as an absolute value of the amplitude of a received radar signal.

In any case, the weighted centre, WC, of the measurement points for an object may be calculated for each dimension as:

$$WC = \frac{1}{\sum_{n=1}^{N} W_n} \sum_{n=1}^{N} (W_n P_n)$$

Where:
N is the number of measurement points for the object;
$W_n$ is the RCS estimate for the $n^{th}$ measurement point; and
$P_n$ is the location (e.g. its coordinate) for the $n^{th}$ measurement point in that dimension.

Figure 4:
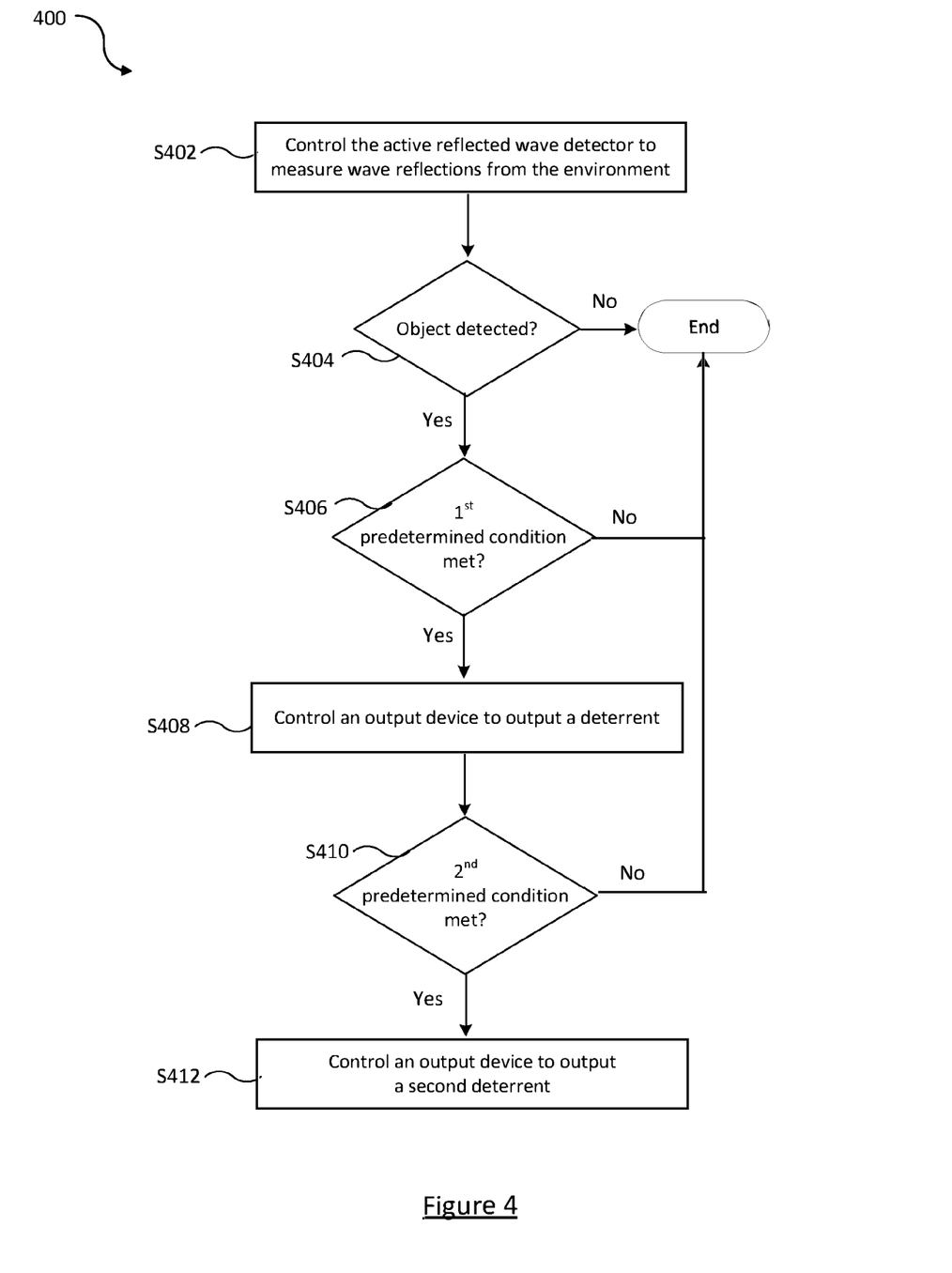
FIG. 4 illustrates a process for for detecting an object in an environment.

FIG. 4 illustrates an example process 400 which may be performed by the CPU 202 for detecting an object in an environment.

At step S402, the CPU 202 controls the active reflected wave detector 206 to measure wave reflections from the environment so that the CPU 202 accrues measured wave reflection data.

In embodiments whereby the CPU 202 is coupled to a motion sensor 204 (either housed in the housing 200 or remote from the device 102), step S402 may be performed in response to a motion sensor detecting motion in the environment. That is, in response to determining that the motion sensor 204 has detected motion in the environment based on receiving an output signal indicative of detected motion from the motion sensor 204, the CPU 202 may perform step S402.

Prior to step S402 the active reflected wave detector 206 may be in a deactivated state. In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements. In these implementations, step S402 comprises the CPU 202 activating the active reflected wave detector 206 so that it is in an activated state and operable to measure wave reflections from a monitored area of the environment 100. The monitored area may correspond to the field of view of the active reflected wave detector 206.

As described in more detail below, rather than controlling the output device 216,218 to output a deterrent in response to the detected motion, the CPU 202 processes data output by the active reflected wave detector 206 to determine whether a deterrent should be output.

At step S404, the CPU 202 processes the measured wave reflection data to determine whether an object is present in the environment. Various techniques may be used to perform step S404. In one possible implementation, step S404 may be performed using a tracking module in the CPU 202 and the CPU 202 determines that an object is present in the environment because a cluster of detection measurements (also referred to as measurement points above) can be tracked by the tracking module.

The tracking module can use any known tracking algorithm. For example, the active reflected wave detector 206 may generate a plurality of detection measurements (e.g. up to 100 measurements, or in other embodiments hundreds of measurements) for a given frame. Each measurement can be taken a defined time interval apart such as 0.5, 1, 2 or 5 seconds apart. Each detection measurement may include a plurality of parameters in response to a received reflective wave signal above a given threshold. The parameters for each measurement may for example include an x and y coordinate (and z coordinate for a 3D active reflected wave detector 206), a peak reflection value, and a Doppler value corresponding to the source of the received radar signal.

The data can then be processed using a clustering algorithm to group the measurements into one or more measurement clusters corresponding to a respective one or more targets. An association block of the tracking module may then associate a given cluster with a given previously measured target. A Kalman filter of the tracking module may then be used to estimate the next position of the target based on the corresponding cluster of measurements and a prediction by the Kalman filter of the next position based on the previous position and one or more other parameters associated with the target, e.g. the previous velocity. As an alternative to using a Kalman filter other tracking algorithms known by the person skilled in the art may be used.

The tracking module may output values of location, velocity and/or RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g. cartesian or polar dimensions), depending on the embodiment.

The Kalman filter tracks a target object between frames and whether the Kalman filter's estimation of the objects' parameters converges to the object's actual parameters may depend on the kinematics of the object. For example, more static objects may have a better convergence. The performance of the Kalman filter may be assessed in real time using known methods to determine whether the tracking meets a predefined performance metric, this may be based on a covariance of the Kalman filter's estimation of the object's parameters. For example, satisfactory tracking performance may be defined as requiring at least that the covariance is below a threshold. Depending on the object's motion, the Kalman filter may or may not produce satisfactory performance within a predefined number of frames (e.g. 3-5 frames). The frames may be taken at a rate of 10 to 20 frames per second, for example. If the RCS is outside that range it may be concluded that the object is inhuman.

If no object is detected, the process 400 ends without a deterrent being output by the device 102.

If an object is detected at step S404, the process 400 proceeds to step S406 where the CPU 202 determines whether a first predetermined condition in respect of the object is met.

For example, at step S406 the CPU 202 may determine whether the detected object is human or not. Any known method for detecting whether the object is human or not can be used. In particular, determining whether the detected object is human may not use a reference object that described above with reference to FIG. 3. In one example, step S406 may be performed using the tracking module referred to above.

In some implementations, the RCS of the object may be used at step S406 to determine whether the detected object is human or not. In particular, from the reflected wave measurements an RCS of an object represented by a cluster of measurement points can be estimated by summing the RCS estimates of each of the measurement points in the cluster. This RCS estimate may be used to classify the target as a human target if the RCS is within a particular range potentially relevant to humans for the frequency of the signal emitted by the active reflected wave detector 206, as the RCS of a target is frequency dependent. Taking a 77 GHz radar signal as an example, from empirical measurements, the RCS (which is frequency dependent) of an average human may be taken to be in the order of 0.5 $m^2$, or more specifically in a range between 0.1 and 0.7 $m^2$, with the value in this range for a specific person depending on the person and their orientation with respect to the radar. The RCS of human in the 57-64 GHz spectrum is similar to the 77 GHz RCS—i.e. 0.1 and 0.7 $m^2$. If the RCS is outside that range it may be concluded that the object is inhuman.

Additionally or alternatively, the velocity information associated with the object may be used at step S406 to determine whether the detected object is human or not. For example, it may be concluded that no human is present if there is no detected object having a velocity within a predefined range and/or having certain dynamic qualities that are characteristic of a human.

The above examples are ways of determining that the object is human, which may reflect that the object is likely to be human, or fails a test which would determine that the object is inhuman thereby implying that the object is potentially human. Thus, it will be appreciated by persons skilled in the art that there may be a significant level of error associated with the determination that the object is human.

If the detected object is determined not to be human (e.g. the object is a pet or other animal), the process 400 ends without a deterrent being output by the device 102. This advantageously avoids unnecessary/nuisance triggering of the output device when it can be determined that the object is not an intruder and thus saves power consumption.

In another example, at step S406 the CPU 202 may determine whether the object is located in a predetermined area within the field of view of the active reflected wave detector 206. As discussed above, such location information may be provided by the tracking module referred to above. The predetermined area within the field of view of the active reflected wave detector 206 may correspond to a region defined by a virtual fence within the field of view of the active reflected wave detector 206. During installation of the device 102, the installer will switch the device to a calibration or configuration mode for the defining of the virtual fence. Exemplary methods for an installer to define such a virtual fence is described in International patent application number PCT/IL2020/050130, filed 4 Feb. 2020, the contents of which are incorporated herein by reference. However, other methods of defining a virtual fence may alternatively be employed. A virtual fence described herein is not necessarily defined by coordinates that themselves define an enclosed area. For example, an installer may simply define a line extending across the field of view of the active reflected wave detector 206 and then configure the virtual fence to encompass an area that extends beyond this line (further away from the active reflected wave detector 206) and is bound by the field of view and range of the active reflected wave detector 206. In another example the encompassed area may correspond to the region detectable by active reflected wave detector 206 that is closer than the line.

If an object is located in the predetermined area within the field of view of the active reflected wave detector 206 this indicates a possible security threat, whereas if the object is outside of the predetermined area this indicates that even though an object is present their presence is not deemed a security threat, or at least not of a sufficient threat to output a deterrent. If the detected object is located outside of the predetermined area, the process 400 ends without a deterrent being output by the device 102. This advantageously avoids triggering of the output device when it can be determined that the presence of the object is not a security concern and thus saves power consumption.

It will be appreciated that at step S406, other predetermined conditions in respect of the object may be checked that are not described herein.

If, at step S406, the CPU 202 determines that the first predetermined condition in respect of the object is met, the CPU 202 determines that an intruder is present in an area of interest, and the process 400 proceeds to step S408. In embodiments whereby a virtual fence is used in the determination at step S406, the "area of interest" corresponds to a portion of the monitored area of the environment. In embodiments whereby no virtual fence is used in the determination at step S406, the "area of interest" may correspond to the entire monitored area of the environment. As noted above, the monitored area of the environment may for example correspond to the field of view of the active reflected wave detector 206.

It will be appreciated that more than one virtual fence may be defined within the field of view of the active reflected wave detector 206, and thus there may be more than one area of interest in the monitored area of the environment.

At step S408, the CPU 202 controls an output device of the device 102 to output a deterrent. Thus, the output of the deterrent is triggered based on a predetermined condition being met based on an output of the active reflected wave detector 206 which provides more relevant triggering than triggering only based on the output of a motion sensor.

At step S408, the CPU 202 may control the lighting device 216 to emit light as a visual deterrent to the intruder.

As noted above, the lighting device 216 comprises one or more light sources, and at step S408 the CPU 202 may control the lighting device 216 to emit light from all of the one or more light sources wherein the light source(s) were not emitting light prior to step S408. That is, all of the light sources(s) of the lighting device 216 are turned on.

In other implementations the light emitted by the lighting device 216 is targeted onto the intruder. In these embodiments, the lighting device 216 comprises multiple light sources which are configured to illuminate a plurality of regions of the environment. The CPU 202 processes the accrued measured wave reflection data to determine a location of the intruder in the environment selectively control one or more of the multiple light sources to emit a beam of light to selectively illuminate the determined location by selecting a subset (e.g. one region or a cluster of regions) of the regions. That is, one or more of the multiple light sources are selected to shine a beam on the person wherever they are identified as being from the output of the active reflected wave detector 206, thus giving them an uneasy feeling that they are being watched, or are exposed or more visible.

In alternative embodiments, a housing of the lighting device 216 that holds one or more light sources may be moveably mounted with respect to a mounting component or assembly (e.g. a bracket). For example the housing of the lighting device 216 may pivot and/or swivel with respect to mounting component or assembly. The relative disposition of the housing of the lighting device 216 with respect the mounting component or assembly may be controlled by one or more motors to enable the direction of illumination to be controlled, as needed.

In any case, the location of the person may be tracked and the illuminated location may change to track the location of the person. In the case of the lighting array, this may be achieved by selecting a different subset of the plurality of illumination regions. In the case of a moveable housing of the lighting device 216 that holds the light source(s), this may be achieved by appropriately actuating the motor(s).

At step S408, the light source(s) of the lighting device 216 that are controlled to emit light may be controlled to constantly emit light, or may be controlled to emit flashing light.

Additionally or alternatively, at step S408 the CPU 202 controls the speaker 218 to emit audio as an audible deterrent to the intruder. The audio emitted by the speaker 218 may be a non-speech sound e.g. a warning siren. Additionally or alternatively the audio emitted by the speaker 218 may be an audible speech message e.g. "this is private property, please leave the area immediately!".

If, at step S406, the CPU 202 determines that the first predetermined condition in respect of the object is met the CPU 202 may additionally transmit an alert message to the control hub 106 for subsequent transmission to one or more of the remote monitoring station 110, the server 112 and the remote personal computing device 114. Additionally or alternatively the CPU 202 may transmit the alert message directly to one or more of the remote monitoring station 110, the server 112 and the remote personal computing device 114.

Optionally, if the CPU 202 determines that the first predetermined condition in respect of the object is met and the CPU 202 is coupled to camera 208 (preferably housed in the housing 200, but alternatively remote from the device 102), the CPU 202 may additionally control the camera 208 to capture an image of said environment. In response to receiving image data associated with a captured image from the camera 208, the CPU 202 may transmit the image data to the control hub 106 for subsequent transmission to one or more of the remote monitoring station 110, the server 112 and the remote personal computing device 114. Additionally or alternatively the CPU 202 may transmit the image data directly to one or more of the remote monitoring station 110, the server 112 and the remote personal computing device 114.

The process 400 may end once the output device outputs the deterrent at step S408.

However, in some embodiments the process 400 may continue after S408 to determine whether it is necessary to output a second deterrent that is to act as an escalated warning of increasing severity e.g. depending on where the person is located and/or their direction of travel and/or other kinetic information. This is described in more detail below.

As shown in FIG. 4, after a predetermined time period has elapsed after output of the deterrent at step S408, the process 400 proceeds to step S410 where the CPU 202 processes further measured wave reflection data accrued by the active reflected wave detector 206 to determine whether a second predetermined condition related to the object is met.

Once the CPU 202 has accrued sufficient measured wave reflection data in order to make the determination at step S406, the CPU 202 may control the active reflected wave detector 206 to be in a deactivated state to conserve power. In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements. In these implementations, step S410 comprises the CPU 202 activating the active reflected wave detector 206 so that it is in an activated state and operable to measure wave reflections from the monitored area of the environment 100.

Preferably, once the CPU 202 has accrued sufficient measured wave reflection data in order to make the determination at step S406 the active reflected wave detector 206 remains in an activated state for at least as long as the intruder is present in the area of interest. This enables the object to be tracked to see its velocity and/or to see if the object at a second time t2 (e.g. used in the assessment at step S410 to determine whether the second predetermined condition is met) is the same object as at first time t1 (e.g. used in the assessment at step S406 to determine whether the first predetermined condition is met).

In other implementations, the active reflected wave detector 206 remains in an activated state throughout the process 400.

The second predetermined condition may be based at least on a location of the object in the environment.

For example, the deterrent output at step S408 may have been based on the object being located in a predetermined area within a field of view of the active reflected wave detector 206, and the second predetermined condition may comprise that the object has remained in this predetermined area after the predetermined time period has elapsed. If this example second predetermined condition is met, this indicates that the intruder has not moved out of the area of interest despite the device 102 outputting the deterrent at step S408.

In another example, the deterrent output at step S408 may have been based on the object being located in a first predetermined area (e.g. a first region defined by a first virtual fence) within a field of view of the active reflected wave detector 206, and the second predetermined condition may comprise that the object has moved such that they are located in a second predetermined area (e.g. a second region defined by a second virtual fence) within the field of view of the active reflected wave detector 206. If this example second predetermined condition is met, this indicates that the intruder has moved into an area of interest that may be more of a concern despite the device 102 outputting the deterrent at step S408. The area of interest may be more of a concern by representing a greater security threat, for example by virtue of being closer to a building or other space to be secured.

The second predetermined condition may be based at least on a direction of travel of the object in the environment. For example, it could be that the object is moving (or has moved) towards the second predetermined area or towards a designated location. An example of an embodiment which involves a first predetermined area and a second predetermined area is described below with reference to FIG. 5.

Figure 5:
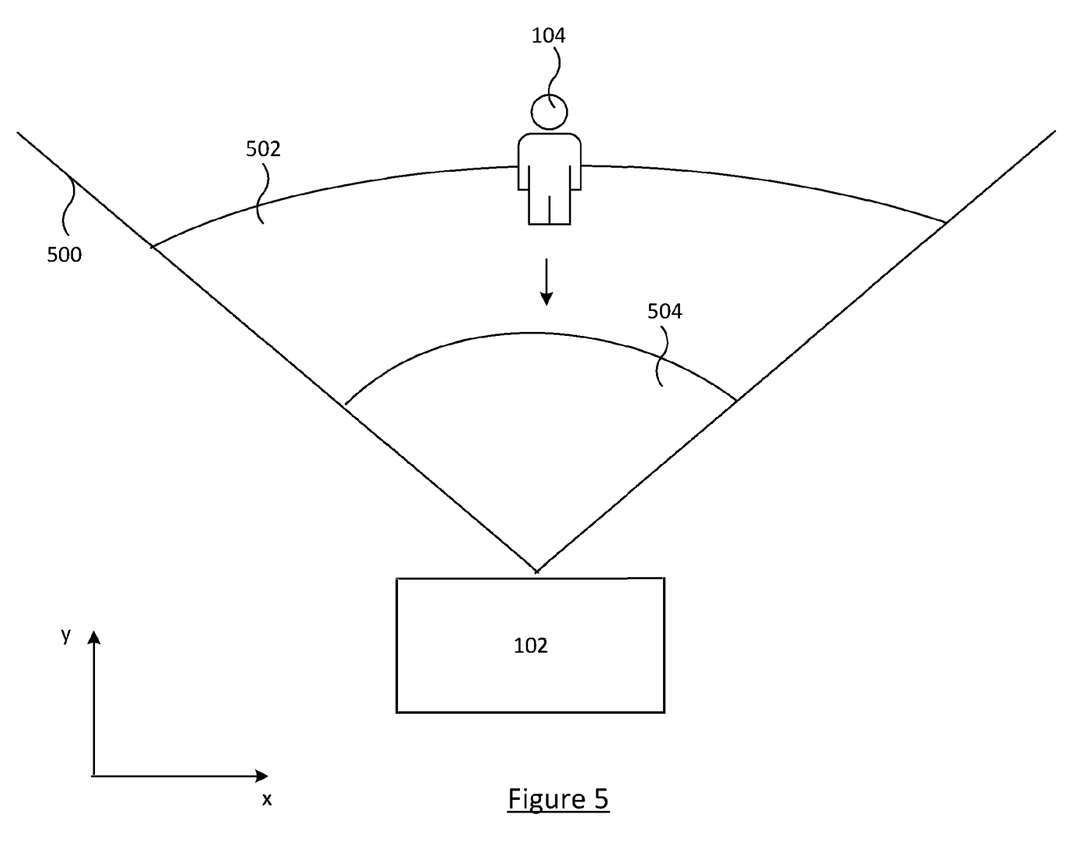
FIG. 5 illustrates predetermined areas within the field of view of the active reflected wave detector.

For example, the deterrent output at step S408 may have been based on the object 104 being located in a first predetermined area 502 (e.g. a first region defined by a first virtual fence) within a field of view 500 of the active reflected wave detector 206, and the second predetermined condition may comprise that the object has moved towards a second predetermined area 504 (e.g. a second region defined by a second virtual fence) within the field of view 500 of the active reflected wave detector 206. If this example second predetermined condition is met, this indicates that the intruder has not moved away from the area of interest in a desired direction despite the device 102 outputting the deterrent at step S408 and has instead moved in a direction towards a sensitive area that is more of a security threat (e.g. they have got closer to a building).

The first predetermined area 502 may be up to but not including the second predetermined area 504. In these examples the first predetermined area 502 may be contiguous with the second predetermined area 504, or the first predetermined area 502 may be non-contiguous with the second predetermined area 504.

In other implementations, the second predetermined area 504 may be inside (i.e. enclosed by) the first predetermined area 502.

Whilst FIG. 5 illustrates the first virtual fence and second virtual fence as both having sections which coincide with a portion of the perimeter of the area of the environment that is monitored by the active reflected wave detector 206, this is merely an example, and any virtual fence described herein need not have a portion that coincides with a portion of the perimeter of the area of the environment that is monitored by the active reflected wave detector 206.

Furthermore whilst the region within the second virtual fence 504 is shown as extending up to the active reflected wave detector 206, this is merely an example. For example, an active reflected wave detector 206 may have limitations for the detection of objects within a certain distance of it and therefore an installer may be restricted on how close to the active reflected wave detector 206 they can define a section of the virtual fence.

The second predetermined condition may be based at least on kinetic information associated with the person e.g. their speed of travel. For example the second predetermined condition may be that the speed of the person does not exceed a predetermined threshold. If this example second predetermined condition is met, this may indicate that the intruder is moving out of the area of interest but are doing it too slowly, or they are simply not moving such that they are staying at the same location. The speed information may be provided by the tracking module referred to above.

If the CPU 202 determines at step S410 that the second predetermined condition is met, the process 400 proceeds to step S412.

At step S412, the CPU 202 controls the output device to output a second deterrent. The second deterrent output at step S412 conveys a heightened sense of urgency that the intruder leaves the area.

At step S412, the CPU 202 may control the lighting device 216 to emit light as a visual deterrent to the intruder. Alternatively, or additionally at step S412 the CPU 202 may control the speaker 218 to emit audio as an audible deterrent to the intruder.

Examples are described below which illustrate how the CPU 202 may control the output device to output a second deterrent which conveys a heightened sense of urgency that the intruder leaves the area.

Taking the example where at step S408 the CPU 202 controls the lighting device 216 to turn on all of the light source(s) of the lighting device 216, at step S412 the CPU 202 may control one or more of the multiple light sources of the the lighting device 216 to shine a targeted beam on the person as described above with respect to the deterrent output at step S408. Alternatively, at step S412 the CPU 202 may control the light source(s) of the lighting device 216 to flash. Alternatively or additionally, at step S412 the CPU 202 may control the speaker 218 to emit audio as an audible deterrent to the intruder in a manner as described above with respect to the deterrent output at step S408.

Taking the example where at step S408 the CPU 202 controls the lighting device 216 to emit flashing light, at step S412 the CPU 202 may control one or more of the multiple light sources of the the lighting device 216 to shine a targeted beam on the person as described above with respect to the deterrent output at step S408. Alternatively, at step S412 the CPU 202 may control the light source(s) of the lighting device 216 to flash at an increased frequency. Alternatively or additionally, at step S412 the CPU 202 may control the speaker 218 to emit audio as an audible deterrent to the intruder in a manner as described above with respect to the deterrent output at step S408.

Taking the example where at step S408 the CPU 202 controls the lighting device 216 to shine a targeted beam (which may be flashing) on the person, at step S412 the CPU 202 may control the one or more of the multiple light sources emitting the beam of light to selectively illuminate the location of the intruder to emit a flashing beam at the location of the intruder. Alternatively or additionally, at step S412 the CPU 202 may control the speaker 218 to emit audio as an audible deterrent to the intruder in a manner as described above with respect to the deterrent output at step S408.

Taking the example where at step S408 the CPU 202 controls the speaker 218 to emit a non-speech sound e.g. a warning siren, at step S412 the CPU 202 may control the speaker to increase the volume of the emitted non-speech sound, and/or change the alarm pattern of the non-speech sound. Alternatively or additionally, at step S412, the CPU 202 may control the speaker 218 to emit an audible speech message. Alternatively or additionally, at step S412 the CPU 202 may control the lighting device 216 to emit light as a visual deterrent to the intruder in a manner as described above with respect to the deterrent output at step S408.

Taking the example where at step S408 the CPU 202 controls the speaker 218 to emit an audible speech message, at step S412 the CPU 202 may control the speaker to increase the volume of the emitted audible speech message and/or to output a different audible speech message. Alternatively or additionally, at step S412, the CPU 202 may control the speaker 218 to emit a non-speech sound e.g. a warning siren. Alternatively or additionally, at step S412 the CPU 202 may control the lighting device 216 to emit light as a visual deterrent to the intruder in a manner as described above with respect to the deterrent output at step S408.

Referring back to step S410, if the CPU 202 determines that that the second predetermined condition is not met the process 400 may end as shown in FIG. 4 without any further output by the output device.

In other embodiments, if the CPU 202 determines whether a third predetermined condition is met, wherein meeting of the third predetermined condition is indicative of a person leaving a location (e.g. a spot or an area), and if the third predetermined condition is met, the CPU 202 performs at least one of: commanding a ceasing of an outputting of a deterrent (e.g. stops a siren and/or a visual deterrent) and/or controlling the speaker 218 to output an audible speech message for encouraging the person to not return and/or to continue to leave. For example consider a case in which the deterrent output at step S408 was based on the object 104 being located in a first predetermined area 502 (e.g. a first region defined by a first virtual fence) within a field of view 500 of the active reflected wave detector 206. The third predetermined condition may be that the object 104 is identified as moving in a direction of leaving the first predetermined area, in which case, the CPU 202 may still control the speaker 218 to emit an audible speech message to encourage the person to continue on their path. For example, the message may be "please continue to leave the area". The third predetermined condition may comprise, or in some embodiments may more specifically be, that the second predetermined condition is not met. In some embodiments, there may be no second predetermined condition.

If, at step S410, the CPU 202 determines that the second predetermined condition in respect of the object is met the CPU 202 may additionally transmit an alert message to the control hub 106 for subsequent transmission to one or more of the remote monitoring station 110, the server 112 and the remote personal computing device 114. Additionally or alternatively the CPU 202 may transmit the alert message directly to one or more of the remote monitoring station 110, the server 112 and the remote personal computing device 114.

Optionally, if the CPU 202 determines that the second predetermined condition in respect of the object is met and the CPU 202 is coupled to camera 208 (either housed in the housing 200 or remote from the device 102), the CPU 202 may additionally control the camera 208 to capture an image of said environment or a part thereof. In response to receiving image data associated with a captured image from the camera 208, the CPU 202 may transmit the image data to the control hub 106 for subsequent transmission to one or more of the remote monitoring station 110, the server 112 and the remote personal computing device 114. Additionally or alternatively the CPU 202 may transmit the image data directly to one or more of the remote monitoring station 110, the server 112 and the remote personal computing device 114. Alternatively only a notification is transmitted, and the image data is only transmitted subsequently, if requested to do so by a remote device (e.g. the control hub 106, the remote monitoring station 110, the server 112, or the remote personal computing device 114).

It will be appreciated from the above that a sequence of deterrents may be output after respective predetermined conditions are met (e.g. the first predetermined condition and the second predetermined condition). This sequence of deterrents may comprise deterrents of different types. Thus it can be seen that in the process 400 described above there may be an escalation, or a progressive escalation, to stronger deterrents as the security threat maintains or increases over time. Whilst the process 400 shown in FIG. 4 has been described with reference to the sequence of deterrents comprising two types of deterrents for simplicity, it will be appreciated that the sequence of deterrents may comprise more than two types of deterrents, such further deterrents being output if further predetermined conditions are met based on processing further measured wave reflection data accrued by the active reflected wave detector 206.

In embodiments of the invention whereby the device 102 monitors an outdoor environment of a residential property, if a first predetermined condition is met it is advantageous to output a first deterrent that is unlikely to disturb (e.g. wake up) the occupants of the property. If the security threat remains or increases over time the likelihood of the occupants of the property being disturbed by way of subsequent deterrents being output may increase. This ensures that a person at home is not unnecessarily woken for a low risk threat but would be alerted for higher risk threats. Such escalation advantageously deters an intruder from getting close to or entering a property.

Escalation of the deterrents is referred to below with reference to an example whereby the processor 202 monitors the presence of an intruder in four different zones of the monitored area of the environment. Each zone being progressively closer to the device 102. It will be appreciated that embodiments of the present disclosure extend to any number of zones in the monitored area of the environment. Such zones may be user configured (e.g. defined by virtual fences). We refer below to example deterrents which may be output when an intruder is detected in each of these zones.

If at step S404 the CPU 202 determines that an object is detected but it is located in an outer zone within the field of view of the active reflected wave detector 206 (this determination not being shown in FIG. 4), the CPU 202 may not output any deterrent.

If at step S406 the CPU 202 determines that an object has moved from the outer zone towards the device 102 into a warning zone, the CPU 202 controls the lighting device 216 to emit light as a visual deterrent to the intruder in one of the various ways as described above with respect to the deterrent output at step S408. In one example, the CPU 202 controls the lighting device 216 to emit flashing light at a lower frequency that is within a first frequency range defined by lower and upper frequency values. At step S406, the CPU 202 may optionally additionally control the speaker 218 to emit audio in the form of auditory beeping as an audible deterrent to the intruder.

If at step S410 the CPU 202 determines that an object has moved from the warning zone towards the device 102 into a deterrent zone, the CPU 202 controls the lighting device 216 to emit light as an escalated visual deterrent to the intruder in one of the various ways as described above with respect to the deterrent output at step S412. In one example, the CPU 202 controls the lighting device 216 to emit flashing light at a higher frequency that is within a second frequency range defined by lower and upper frequency values. At step S410, the CPU 202 may optionally additionally control the speaker 218 to emit more intensive audio e.g. auditory beeping with increased volume or having a different alarm pattern to the previously output auditory beeping, or audio in the form of an audible speech message (e.g. telling the intruder to leave).

Whilst not shown in FIG. 4, after a predetermined time period has elapsed after output of the deterrent at step S412, the CPU 202 may process further measured wave reflection data accrued by the active reflected wave detector 206 to determine that an object has moved from the deterrent zone towards the device 102 into an alarm zone (which in this illustrative example is the inner most zone located closest to the device 102). In response to this determination the CPU 202 controls the speaker 218 to emit audio in the form of an alarm siren. The CPU 202 may additionally control the lighting device 216 to emit light as a visual deterrent to the intruder in a manner as described above. The CPU 202 may additionally transmit an alert message to one or more of the remote monitoring station 110, the server 112 and the remote personal computing device 114 (either directly or via the control hub 106).

In implementations described above, when the lighting device 216 emits flashing light the light may be emitted with a constant duty cycle (e.g. at a 50% duty cycle). Alternatively the flashing could occur periodically. The duty cycle for any given zone referred to above may be constant or it may vary over time (e.g. varying between a lower duty cycle value and an upper duty cycle value). Similarly, the frequency of the light emitted for any given zone referred to above may be constant or it may vary over time (e.g. varying between a lower frequency value and an upper frequency value).

Whilst FIG. 4 has been described above with reference to the CPU 202 of the device 102 performing all of the steps in the process 400, this is just an example. Functions that are described herein as being performed by the CPU 202 may be performed on a distributed processing system that is distributed amongst a plurality of separate apparatuses.

For example, the processing of measured wave reflection data and the determination as to whether any of the described predetermined conditions are met may be performed by the processor of a remote device that is remote from the device 102. In these embodiments the CPU 202 transmits the measured wave reflection data to the remote device for processing.

The term "module," as used herein generally represent software, firmware, hardware, or a combination thereof. In the case of a software implementation, the module represents program code that performs specified tasks when executed on a processor (e.g. CPU or CPUs). The program code can be stored in one or more computer readable memory devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for detecting an object in an environment, the apparatus comprising:
   a processor configured to:
   control an active reflected wave detector to measure wave reflections from the environment to accrue measured wave reflection data;
   process the measured wave reflection data to detect an object in said environment;
   in response to detection of said object, determine whether a first predetermined condition in respect of the object is met; and
   if the first predetermined condition is met, control an output device to output a deterrent; wherein the processor is further configured to:
   process further measured wave reflection data accrued by the active reflected wave detector to determine whether, after a predetermined time period has elapsed after output of the deterrent, a second predetermined condition in respect of the object is met, wherein the second predetermined condition comprises: that the deterrent was output based on the object being located in a predetermined area within a field of view of the active reflected wave detector, and the object remains in said predetermined area after a predetermined time period has elapsed after output of said deterrent; and
if the second predetermined condition is met, control an output device to output a second deterrent, wherein the second predetermined condition is based at least on a location of said object in the environment.

2. The apparatus according to claim 1, wherein the processor is configured to control the active reflected wave detector to measure wave reflections from the environment in response to a motion sensor detecting motion in said environment.

3. The apparatus according to claim 1, wherein the first predetermined condition in respect of the object comprises that the object is determined to be human.

4. The apparatus according to claim 1, wherein the first predetermined condition in respect of the object comprises that the object is located in a predetermined area within a field of view of the active reflected wave detector.

5. The apparatus according to claim 1,
in response to determining that the first predetermined condition is met, the processor is configured to control a lighting device comprising at least one light source to emit light as said deterrent.

6. The apparatus according to claim 5, wherein the lighting device comprises an array of multiple light sources configured to illuminate a plurality of regions, wherein the processor is configured to process the measured wave reflection data to determine a location of said object in the environment and selectively control one or more of the multiple light sources to emit a beam of light to selectively illuminate said location by selecting a subset of the regions.

7. The apparatus according to claim 6, wherein the multiple light sources are light emitting diodes.

8. The apparatus according to claim 1, in response to determining that the first predetermined condition is met, the processor is configured to control a speaker to emit audio as said deterrent.

9. The apparatus according to claim 1, wherein the second predetermined condition is based at least on a direction of travel of said object in the environment determined after a predetermined time period has elapsed after output of said deterrent.

10. The apparatus according to claim 9, wherein the second predetermined condition comprises that the deterrent was output based on the object being located in a first predetermined area within a field of view of the active reflected wave detector, and the object has moved towards a second predetermined area or a designated location within the field of view of the active reflected wave detector.

11. The apparatus according to claim 1, wherein if the second predetermined condition is met, the processor is configured to control a camera to capture an image of said environment.

12. The apparatus according to claim 1, wherein the processor is configured to:
process further measured wave reflection data accrued by the active reflected wave detector to determine whether a third predetermined condition in respect of the object is met, the third predetermined condition indicative of the object leaving a location in said environment,
and if the third predetermined condition is met, the processor is configured to perform at least one of:
control a speaker to output an audible speech message; or
control the speaker to cease output of the deterrent.

13. The apparatus according to claim 1, wherein the processor is configured to control a speaker to emit audio as the second deterrent.

14. The apparatus according to claim 1, wherein the active reflected wave detector is a radar sensor.

15. The apparatus according to claim 1, comprising a housing holding the processor, wherein the housing additionally holds one or any combination of: the motion sensor, the active reflected wave detector, and the camera.

16. A computer implemented method for detecting an object in an environment, the method comprising:
controlling an active reflected wave detector to measure wave reflections from the environment to accrue measured wave reflection data;
processing the measured wave reflection data to detect an object in said environment;
in response to detection of said object, determining whether a first predetermined condition in respect of the object is met;
if the first predetermined condition is met, controlling an output device to output a deterrent;
processing further measured wave reflection data accrued by the active reflected wave detector to determine whether, after a predetermined time period has elapsed after output of the deterrent, a second predetermined condition in respect of the object is met, wherein the second predetermined condition comprises: that the deterrent was output based on the object being located in a predetermined area within a field of view of the active reflected wave detector, and the object remains in said predetermined area after a predetermined time period has elapsed after output of said deterrent; and
if the second predetermined condition is met, controlling an output device to output a second deterrent, wherein the second predetermined condition is based at least on a location of said object in the environment.

17. A non-transitory computer-readable storage medium comprising instructions which, when executed by a processor cause the processor to perform a method of:
controlling an active reflected wave detector to measure wave reflections from the environment to accrue measured wave reflection data;
processing the measured wave reflection data to detect an object in said environment;
in response to detection of said object, determining whether a first predetermined condition in respect of the object is met;
if the first predetermined condition is met, controlling an output device to output a deterrent;
processing further measured wave reflection data accrued by the active reflected wave detector to determine whether, after a predetermined time period has elapsed after output of the deterrent, a second predetermined condition in respect of the object is met, wherein the second predetermined condition comprises: that the deterrent was output based on the object being located in a predetermined area within a field of view of the active reflected wave detector, and the object remains in said predetermined area after a predetermined time period has elapsed after output of said deterrent; and
if the second predetermined condition is met, controlling an output device to output a second deterrent, wherein the second predetermined condition is based at least on a location of said object in the environment.

18. A system for detecting an object in an environment, the system comprising:
a first device comprising an active reflected wave detector to measure wave reflections from the environment to accrue measured wave reflection data; and at least one processor, wherein the at least one processor is configured to:

process the measured wave reflection data to detect an object in said environment;

in response to detection of said object, determine whether a first predetermined condition in respect of the object is met;

control an output device to output a deterrent based on at least that the first predetermined condition is met;

process further measured wave reflection data accrued by the active reflected wave detector to determine whether, after a predetermined time period has elapsed after output of the deterrent, a second predetermined condition in respect of the object is met, wherein the second predetermined condition comprises: that the deterrent was output based on the object being located in a predetermined area within a field of view of the active reflected wave detector, and the object remains in said predetermined area after a predetermined time period has elapsed after output of said deterrent; and if the second predetermined condition is met, control an output device to output a second deterrent, wherein the second predetermined condition is based at least on a location of said object in the environment.

19. The apparatus of claim 1, wherein the location of said object in the environment is provided in 2 or 3 dimensions by a tracking module.

20. The apparatus of claim 1, wherein the deterrent is a different type of deterrent to the second deterrent.

* * * * *